United States Patent Office 2,972,075
Patented Feb. 14, 1961

2,972,075

COLOR-PHOSPHOR SCREENS

Martin R. Royce and Austin E. Hardy, Lancaster, Pa., assignors to Radio Corporation of America, a corporation of Delaware No Drawing. Filed Apr. 1, 1958, Ser. No. 725,496

3 Claims. (Cl. 313—92)

The principal object of the present invention is to provide a method of and means for minimizing "faceplate haze" in color-kinescope and thus to enhance the clarity of the optical images reproduced on the color-phosphor mosaic screens of such tubes.

Present day color-kinescopes exhibit a screen quality defect known as "faceplate haze." This undesired phenomenon is manifest as a tint of a specific color when the (curved) screen of the kinescope is viewed at a wide angle. That is to say, the tint or haze is not ordinarily observable from viewing angles near the normal but appears and grows rapidly in size to a maximum as the angle of view, measured from the normal, approaches ninety degrees.

The present invention may be said to be predicated upon an appreciation of three facts: (1) "Faceplate haze" phenomenon is related to the degree of optical contact that the color-phosphor crystals have with the glass. (2) Different color-phosphors when applied to glass exhibit different optical contact values. (3) The color-phosphor that makes the best optical contact with the glass determines the color or tint of the haze. For example: a commercially available color-phosphor screen that exhibits blue-green faceplate haze is made with three color-phosphor slurries whose optical contact values are 16% for the red phosphor (manganese activated zinc phosphate), 40% for the green phosphor (manganese activated zinc silicate, i.e. willemite), and 65% for the blue phosphor (silver activated zinc sulphide).

Before proceeding with the description of the invention, it may be well to define the terms "optical contact" and "degree of optical contact," as employed in this specification and in the accompanying claims. In this connection, it will be recalled that when two surfaces approach each other with a separation less than a small fraction of a wavelength of light, certain optical effects, on rays traversing the interface, such as reflection, are reduced or disappear. If this condition is reached, the surfaces are said to be "in optical contact." If only a fraction of the available contact area meets this condition, that fraction is expressed as a percent of the total area. As applied to phosphor crystals, this means that light emission and light distribution, under a condition of high optical contact, occurs as if the crystals were physically embedded in the glass faceplate.

At present, there is no "standard" method of measuring optical contact. In the measurements mentioned in this specification use is made of the fact that a portion of the light from phosphor crystals in optical contact suffer total internal reflection within the faceplate. By measuring the amount of light coming out through the edge of the face plate, a quantity related to "optical contact" is set up. One way of doing this is to place the screened glass over an incandescent light source and to measure the light coming out through one edge of the glass substrata by means of a collimator tube and a cadmium selenide photoconductor. By using a glass plate with a sandblasted surface instead of phosphor, an arbitrary reading of 100 is obtained. By using a clear piece of glass not sandblasted nor coated with phosphor, a reading of 0 is obtained. Measures of pieces of glass coated with phosphors thus give readings of between 0 and 100.

The present invention teaches that the essential condition for "no haze," in a tri-color tube, is "matched" optical contact values for the three color-phosphors. The "match" may be made at any level. For example, haze is reduced when the optical contact of the red phosphor, in the foregoing example, is raised more nearly to equal that of the blue and green phosphors. Alternatively, haze is reduced by decreasing the optical contact with the glass of the blue and green phosphors with respect to that of the red phosphor.

In the above connection, it should be noted that the highest possible degree of optical contact is not ordinarily to be desired. In fact, the ideal color-phosphor screen would be one wherein the phosphors are entirely out of optical contact with the glass. Since such an "ideal" is impossible of practical achievement the preferred practice is to select a degree of optical contact sufficient to ensure adequate physical resistance to electron-bombardment, and to ordinary handling, and then to raise or to lower (as the case may be) the optical contact values of the individual phosphors as closely to the selected value as may be practical. As previously mentioned, a tri-color screen having optical contact values of 65–40–16 (blue, green, red) exhibited an objectionable blue-green faceplate haze. The "haze" however was not apparent when the optical contact value of the red phosphor was made to match that of the green phosphor in a screen wherein three optical contact values were 65–40–40.

*Example No. 1.*—Where matching of the optical contact values of the different color-phosphors is to involve an increase in the optical contact value of a particular phosphor (say that of the "red" phosphor, manganese activated zinc phosphate) the increase is achieved in accordance with the invention by the addition to the selected phosphor slurry, preferably prior to ball-milling, of a highly purified sodium lignosulfonate, or similar dispersant, capable of enhancing the optical-bonding characteristics of the phosphor and glass at their interface. Such a dispersant is marketed by the Marathon Corporation under the trade-name "Marasperse N." When the now conventional "direct photographic method" of laying down the color-phosphors is employed the red-phosphor slurry should preferably contain 0.5–2.0 grams of sodium lignosulfonate to 100.0 grams of red-phosphor.

*Example No. 2.*—Where matching of the optical contact value of the different color-phosphors is to involve a decrease in the optical contact value of a particular phosphor (say that of the blue-phosphor or of the green-phosphor in the foregoing example) the decrease is achieved in accordance with the invention by the addition to the selected phosphor slurry, preferably prior to ball milling, of from say, 5% to, say, 10% of an inert flatting agent such as silica aerogel, or other mineral filler material which will decrease the optical bonding characteristic of the phosphor and glass at their interface without substantially impairing the efficiency of the phosphor. For example, the addition of 5 to 10 grams of a silica aerogel known as "Cab-O-Sil" to each 100 grams of the blue and green phosphors (previously identified) was sufficient to reduce the optical contact of said phosphors to the level of the red phosphor and to eliminate the blue-green haze. "Syton" is the trade-name of another (colloidal) silica aerogel suitable for the purpose. Various mineral filler materials, also suitable, are marketed by Johns-Manville Co. under the trade-name "Micro-Cel."

What is claimed is:

1. A cathode ray tube having a glass faceplate and a color-phosphor screen of the mosaic variety on the inner surface of said faceplate, said color-phosphor screen being characterized by substantial uniformity in the optical contact of the different color-phosphors with the glass, whereby said screen when activated by electron-bombardment is substantially free from color haze when viewed at a wide angle.

2. Method of photographically laying down, on a glass screen-plate, a tricolor mosaic pattern constituted essentially of color phosphors which normally exhibit different degrees of optical contact with the glass, said method comprising photographically deriving those elemental areas of said mosaic pattern which are allotted to the phosphor that normally exhibits a degree of optical contact lower than that of the other color phosphors from a photosensitized phosphor coating which contains a dispersant in a quantity sufficient to increase the degree of optical contact of the phosphor in said coating to a value corresponding substantially to that higher degree of optical contact normally exhibited by at least one of the others of said phosphors.

3. Method of photographically laying down, on a glass screenplate, a tricolor mosaic pattern constituted essentially of color phosphors which normally exhibit different degrees of optical contact with the glass, said method comprising photographically deriving those elemental areas of said mosaic pattern which are allotted to the phosphor that normally exhibits the highest of said degrees of optical contact from a photosensitized phosphor coating which contains an inert flatting agent in a quantity sufficient to decrease the degree of optical contact of the phosphor in said coating to a value corresponding substantially to the lower degree of optical contact normally exhibited by at least one of the others of said phosphors.

References Cited in the file of this patent

UNITED STATES PATENTS

| | | |
|---|---|---|
| 2,573,051 | Pakswer | Oct. 30, 1951 |
| 2,621,134 | Welch | Dec. 9, 1952 |
| 2,647,841 | Perl et al. | Aug. 4, 1953 |
| 2,649,388 | Wills | Aug. 18, 1953 |
| 2,676,894 | Anderson | Apr. 27, 1954 |
| 2,761,990 | Amdrusky et al. | Sept. 4, 1956 |
| 2,828,217 | Levin et al. | Mar. 28, 1958 |

OTHER REFERENCES

"Surface Active Agents," by Schwartz-Perry Interscience Pub. Inc., New York, N.Y. (1949), pages 121 and 475.